March 25, 1958    M. G. BECK ET AL    2,828,095

MOUNTING WITH EXTENDED SKIRT FOR SNUBBING

Filed Sept. 27, 1954

Merrill G. Beck
Ralph E. Tuttle
INVENTORS

BY
Ralph Hammar
Attorney

United States Patent Office 2,828,095
Patented Mar. 25, 1958

2,828,095

MOUNTING WITH EXTENDED SKIRT FOR SNUBBING

Merrill G. Beck, Erie, Pa., and Ralph E. Tuttle, Bell, Calif., assignors to Lord Manufacturing Company, Erie, Pa., a corporation of Pennsylvania Application September 27, 1954, Serial No. 458,451

1 Claim. (Cl. 248—9)

This invention is intended to simplify the installation of resilient mountings such as used for internal combustion engines and the like. In a preferred form, the mounting comprises tubular bushing of resilient material having a metal tube bonded in its center. At one end of the bushing is an enlarged head projecting radially outside the body of the bushing. At the other end of the bushing is an axial extension or skirt projecting beyond the metal tube. The mounting is installed by inserting the small end of the bushing through a hole in a suporting member and arranging the supported member on the enlarged head. A bolt extending from the supported member through the metal tube expands the axial extension of the rubber bushing radially outward to provide a rebound or snubbing shoulder and at the same time fastens the bushing to the supporting member.

Figure 1:
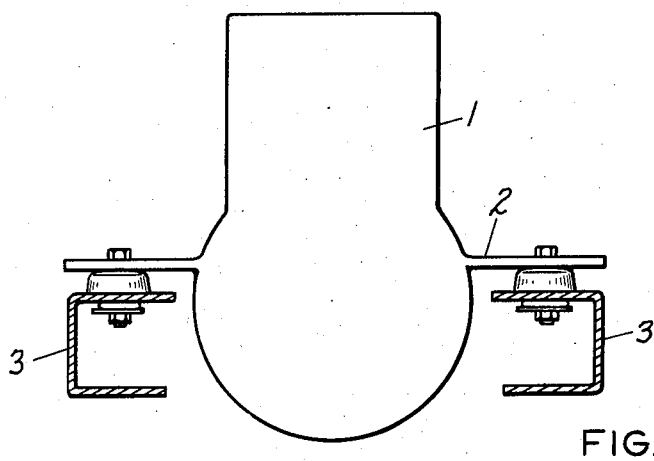
Figure 2:
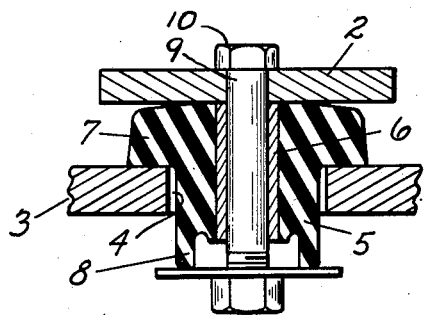
Figure 3:
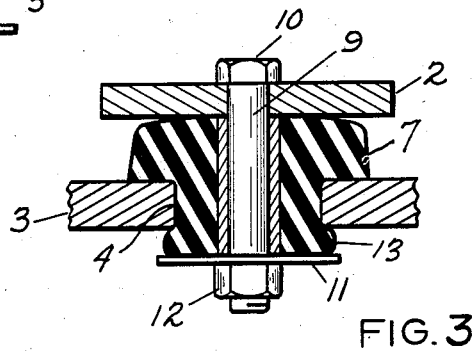

In the drawing, Fig. 1 is a diagramatic view showing the mountings supporting an internal combustion engine, Fig. 2 is an enlarged section through the mounting at the start of the installation, and Fig. 3 is a similar section through the installed mounting.

In the drawing, the invention is shown applied to an automobile engine mounting where 1 indicates the engine having brackets 2 at opposite sides thereof extending over the side frames 3 of the automobile.

As shown more clearly in Fig. 2 and Fig. 3, the side frames 3 have holes 4 therein for receiving the small diameter ends of tubular bushings 5 of rubber or like resilient material. At the center of each of the bushings is bonded a rigid metal tube 6 the upper end of which is flush with the top of an enlarged head 7 which projects radially outside the body of the bushing 5 and overlaps the upper surface of the frame 3. The lower end of the metal tube 6 terminates short of the lower end of the bushing and is surrounded by an axially depending tubular extension or skirt 8 of substantially the same outside diameter as the body of the bushing 5 and having an inside diameter greater than the outside diameter of the tube. The hole 4 is of slightly greater diameter than the body of the bushing so that the bushing can be merely dropped in place at the start of the assembly operation. The assembly of the mounting is completed by tightening a bolt 9 having its head 10 on the upper surface of the bracket 2 and its lower threaded end projecting beyond the lower end of the metal tube 6. A washer 11 arranged between a nut 12 and the skirt 8 forces the skirt upward as the nut is tightened and expands the skirt 8 radially outward as indicated in Fig. 3 to provide a snubbing shoulder 13 engaging the underside of the frame 3 around the opening or hole 4. The pressure exerted by the washer also expands the body of the bushing into tight engagement with the hole 4. The metal tube 6 at the center of the bushing provides for controlled tightening of the bolt since the tightening of the bolt is limited by the engagement of the washer with the lower end of the metal sleeve 6. Accordingly, the mounting has essentially the same characteristics in any installation and is not dependent upon the manner upon which the bolt is tightened.

After installation, the weight of the engine is taken through the metal sleeve 6 and is transmitted in shear to the surrounding rubber bonded to the sleeve. There is also a compression stress between the underside of the motor bracket 2 and the head 7 on the bushing. Rebound snubbing is taken by the shoulder 13 formed when the skirt 8 is expanded radially outward against the underside of the supporting member 3.

What is claimed as new is:

In a resilient mounting a supporting member having a hole therein, a bushing of resilient material having a body of substantially the diameter of the hole extending through the hole and having at one end an enlarged head projecting radially outside the body of the bushing and resting on the adjacent surface of the supporting member around said hole, a metal tube bonded in the center of the bushing and having one end terminating substantially flush with the head, a tubular skirt on the other end of the bushing having an outside diameter substantially the same as the body of the bushing and having an inside diameter greater than the inside diameter of the body of the bushing, said skirt projecting axially from the body of the bushing in substantially direct continuation of the body of the bushing and beyond the other end of the tube, the other end of the tube and the skirt extending through the hole in the supporting member beyond the surface of the supporting member opposite the head of the bushing, a supported member resting on the head of the bushing and having a hole therein aligned with the tube, a washer plate at the bottom end of the skirt, and bolt means extending from the supported member through the bore of the tube and washer plate for clamping the supported member to the tube and compressing the skirt and expanding it radially outward outside the diameter of the body of the bushing to engage the surface of the supporting member opposite the head to provide a snubbing shoulder limiting rebound.

References Cited in the file of this patent

UNITED STATES PATENTS

| 2,273,491 | Leedy | Feb. 17, 1942 |
| 2,361,184 | Ellis et al. | Oct. 24, 1944 |
| 2,453,991 | Kaemmerling | Nov. 16, 1948 |
| 2,455,891 | Flanagan | Dec. 7, 1948 |
| 2,520,757 | Cain | Aug. 29, 1950 |